United States Patent [19]
Stoll et al.

[11] Patent Number: 5,692,306
[45] Date of Patent: Dec. 2, 1997

[54] HAND-HELD WORKING TOOL

[75] Inventors: Gerhard Stoll, Winnenden; Heinz Hettmann, Schorndorf, both of Germany

[73] Assignee: Andreas Stihl, Waiblingen, Germany

[21] Appl. No.: 626,663

[22] Filed: Jan. 25, 1996

[30] Foreign Application Priority Data

Jan. 25, 1995 [DE] Germany .................. 195 02 171.1

[51] Int. Cl.$^6$ .................................................. F16C 1/06
[52] U.S. Cl. ........................ 30/276; 173/162.1; 173/162.2
[58] Field of Search ........................ 30/276; 173/162.1, 173/162.2, 162

[56] References Cited

U.S. PATENT DOCUMENTS

| | | | |
|---|---|---|---|
| 3,581,832 | 6/1971 | Herrmann et al. | 173/162.2 |
| 3,728,793 | 4/1973 | Makinson et al. | 173/162.1 |
| 3,849,883 | 11/1974 | Kolorz | 173/162.1 |
| 4,236,310 | 12/1980 | Müller | 30/276 |
| 4,491,184 | 1/1985 | Kawaharazuka | 173/162.1 |
| 4,586,322 | 5/1986 | Yokocho et al. | 30/276 |
| 4,662,158 | 5/1987 | Zerrer | 30/276 |
| 4,817,738 | 4/1989 | Dorner et al. | 30/276 |
| 4,825,548 | 5/1989 | Driggers | 30/276 |

*Primary Examiner*—Hwei-siu Payer
*Attorney, Agent, or Firm*—Robert W. Becker & Associates

[57] ABSTRACT

A hand-held working tool has a tool member and a drive unit with an internal combustion engine drivingly connected to the tool member. A grip unit with vibration damping members is connected with the vibration damping members to the drive unit. Receiving cages for receiving the vibration damping members are connected either to the drive unit or the grip unit. Pins with a longitudinal axis are connected to the other one of the drive unit or the grip unit. They extend in the direction of the longitudinal axis at least partly into the receiving cages so as to be positioned substantially centrally in the vibration damping members. The vibration damping members have a greater extension in the direction of a first axis, extending substantially perpendicular to the longitudinal axis, than in a direction of a second axis, extending also substantially perpendicular to the longitudinal axis.

25 Claims, 6 Drawing Sheets

HAND-HELD WORKING TOOL

BACKGROUND OF THE INVENTION

The present invention relates to a hand-held working tool, especially a trimmer, a motor chainsaw or a similar portable working tool, comprising a drive unit with an internal combustion engine for driving the tool member as well as a grip unit connected with vibration damping members with the drive unit, whereby each vibration damping member is received at least over a portion of its length in a receiving cage, connected to either the drive unit or the grip unit, and a pin of the respectively other unit extends at least partially into the receiving cage so as to be positioned centrally within the vibration damping member.

From U.S. Pat. No. 4,662,158 a trimmer is known in which the internal combustion engine of the drive unit drives a tool member in the form of a cutting blade via a drive shaft positioned within a guide tube of the drive unit. The grip unit is comprised of a grip housing connected with vibration damping members to the motor housing as well as to a support at the guide tube. To the grip housing a grip tube with handles for guiding the trimmer is fastened. The grip housing, which is clamped between the motor housing and the support, is coupled with vibration damping members to the drive unit. With soft vibration damping members a good decoupling is possible; however, an impaired guiding due to the soft damping members which allow for a relatively great range of movement results. When a good, direct guiding behavior is required, the vibration damping members must be hard which, however, results in decreased decoupling action causing disturbing vibrations within the grip housing and at the grip tube. These contradictory requirements, i.e., a good, direct guiding behavior, on the one hand, and a good decoupling action for producing a high damping effect, on the other hand, can only be reconciled by compromising.

In U.S. Pat. No. 4,236,310 it has been suggested for a hand-held working tool to decouple the grip unit with vibration damping members which, depending on the type of work to be performed, can be adjusted according to their characteristic line. For this purpose, the interior of the vibration damping member positioned between the two units is filled with a pressure medium, so that the damping member is stiffer, i.e., harder. When a direct guiding behavior is required, the damping member is loaded with pressure medium; however, the grip unit is then greatly subjected to vibrations. When a direct guiding behavior is not required, the pressure medium is released so that a strong damping effect and thus a good, vibration-free support of the grip unit results. Such adjustable damping members, however, are not suitable for small, hand-held working tools such as trimmers, cutters, motor chainsaws etc due to the great technical expenditure.

It is therefore an object of the present invention to improve a hand-held working tool of the aforementioned kind such that an excellent vibration damping effect is achieved while a good, direct guiding behavior is maintained.

SUMMARY OF THE INVENTION

A hand-held working tool according to the present invention is primarily characterized by:

A tool member;

A drive unit with an internal combustion engine drivingly connected to the tool member;

A grip unit comprising vibration damping members, the grip unit connected with the vibration damping members to the drive unit;

2

Receiving cages for receiving the vibration damping members, wherein the receiving cages are connected to one of the drive unit and the grip unit.

Pins connected to the other one of the drive unit and the grip unit, the pins having a longitudinal axis and extending in the direction of the longitudinal axis at least partly into the receiving cages so as to be positioned substantially centrally in the vibration damping members; and Wherein the vibration damping members have a greater extension in a direction of a first axis extending substantially perpendicular to the longitudinal axis then in a direction of a second axis extending substantially perpendicular to the longitudinal axis.

Preferably, the second axis is substantially perpendicular to the first axis.

In a preferred embodiment of the present invention, the longitudinal axis is a Z-axis, the first axis is an X-axis, and the second axis is a Y-axis of a three-dimensional Cartesian coordinate system.

Advantageously, the vibration damping members are symmetrical relative to the first and second axes.

In a preferred embodiment of the present invention, the vibration damping members are comprised of a core with radial symmetry and outer projections integrally connected to the core so as to be diametrically oppositely arranged at the core.

Preferably, the outer projections have a parallelepipedal contour.

Expediently, the core is comprised of an outer ring with radially inwardly extending support projections.

The core may further comprise an inner ring supported by the support projections.

Preferably, the support projections are longitudinal stays connecting the inner ring and the outer ring.

Advantageously, between the inner ring and the outer ring longitudinal holes are positioned which extend through the vibration damping members in the direction of the longitudinal axis.

Preferably, the longitudinal holes have an identical diameter.

In yet another embodiment of the present invention, the longitudinal holes are equidistantly spaced in a circumferential direction of the inner ring.

Preferably, the longitudinal holes are arranged so as to describe a circle.

In another embodiment of the present invention, between the inner ring and the outer ring longitudinal curved slots are positioned which extend through the vibration damping members in the direction of the longitudinal axis.

Preferably, the longitudinal curved slots have an identical length in a circumferential direction of the inner and the outer rings.

Expediently, the longitudinal curved slots are equidistantly spaced in the circumferential direction of the inner ring.

The longitudinal curved slots are arranged so as to describe a circle.

Preferably, the vibration damping members comprise a hollow space in the area of the projections, wherein the hollow space extends in the direction of the longitudinal axis.

The vibration damping members preferably have end faces in the direction of the longitudinal axis and the hollow space is open at the end faces.

Advantageously, the hollow space is positioned between the core and the projection.

Preferably, the hollow space is positioned directly adjacent to a projected outer mantle surface of the core.

In yet another embodiment of the present invention the hollow space in a circumferential direction of the core extends over the entire width of the projection.

The hollow space in a circumferential direction of the core preferably has a varying height.

In a preferred embodiment of the present invention, the vibration damping members, in the direction of the first axis, rest without play within the receiving cages.

Preferably, the vibration damping members in the direction of the second axis rest with play within the receiving cage.

The inventive vibration damping member is adapted with respect to its operation relative to the different planes of action by constructive measures. This means that in the guiding plane of the working tool the vibration damping member is designed so as to provide a direct guiding behavior, while in a plane perpendicular to the guiding plane the damping member is designed so as to provide a good damping action. This requires that the vibration damping member no longer has radial symmetry, but is provided with a shape that differs from a circular shape. Along a first spatial axis (X-axis) perpendicular to its length the vibration damping member has a greater extension than along a second spatial axis (Y-axis) perpendicular to its length. Preferably, the spatial axes are positioned perpendicular to one another and form together with the longitudinal axis of the pins (i.e., the longitudinal axis of the vibration damping member) a Cartesian coordinate system.

The vibration damping member, in a further embodiment of the invention, is designed such that relative to a one, two, or three axes of the Cartesian coordinate system it is symmetrically designed.

Preferably, the vibration damping member is comprised of a central core, having substantially radial symmetry, with diametrically oppositely arranged projections that form a unitary part together with a core. The core, which is substantially of radial symmetry, ensures excellent damping for all vibrations occurring transverse to the pin, while the diametrically oppositely arranged unitary projections ensure a direct guiding behavior. Preferably, in the area of the projections a hollow space is provided which extends substantially over the length of the vibration damping member. Upon loading with guiding forces the hollow space can be bridged, i.e., the opposite inner surfaces of the hollow space contact one another in the direction of the guiding forces.

Due to the arrangement of hollow spaces of different design and size, the desired damping effect of the vibration damping member can be constructively predetermined. The position of mounting of such a vibration damping member is then always such that the Z-X plane is the guiding plane, while the Z-Y plane is substantially perpendicular to the guiding plane.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 9.

The inventive embodiment of a hand-held working tool shown in the drawing is a trimmer comprised of a drive unit 1, which rotatingly drives a tool member in the form of a cutter head 5 provided with a cutting thread 3. The drive unit 1 is comprised of a motor housing 10 in which an internal combustion engine (not illustrated), especially a two-stroke engine, is arranged which drives via clutch 11 a drive shaft positioned within the guide tube 12 in order to rotate via angle head 13 the cutter head 5.

The hand-held working tool comprises a grip unit 2 which is comprised of a grip housing 20 with a grip tube 21 connected thereto. The grip tube 21 is substantially designed in the manner of a handle bar and fixed via clamping parts 22 to the grip housing 20. The grip housing 20 in cross-section is a substantially rectangular tube (FIG. 2) which coaxially surrounds the guiding tube 12 at a distance. For this purpose, the grip tube 21 is supported with one end face at the motor housing 10 and with the other end face at a housing support 23 which itself is fastened by clamping with a clamp 24 to the guide tube 12.

At the upper side of the grip housing 20 which is facing the operator, a bridge stay 4 is provided which extends from the mantle of the grip housing 20 to the base of the clamping parts 22 of the grip tube 21. The bridge stay 4 is provided with a plurality of openings 4' for receiving a carabiner hook 6 of a support belt 7 with which the trimmer is carried by the operator 9. The belt 7 extends over the shoulder 8 of the operator 9.

Figure 2:
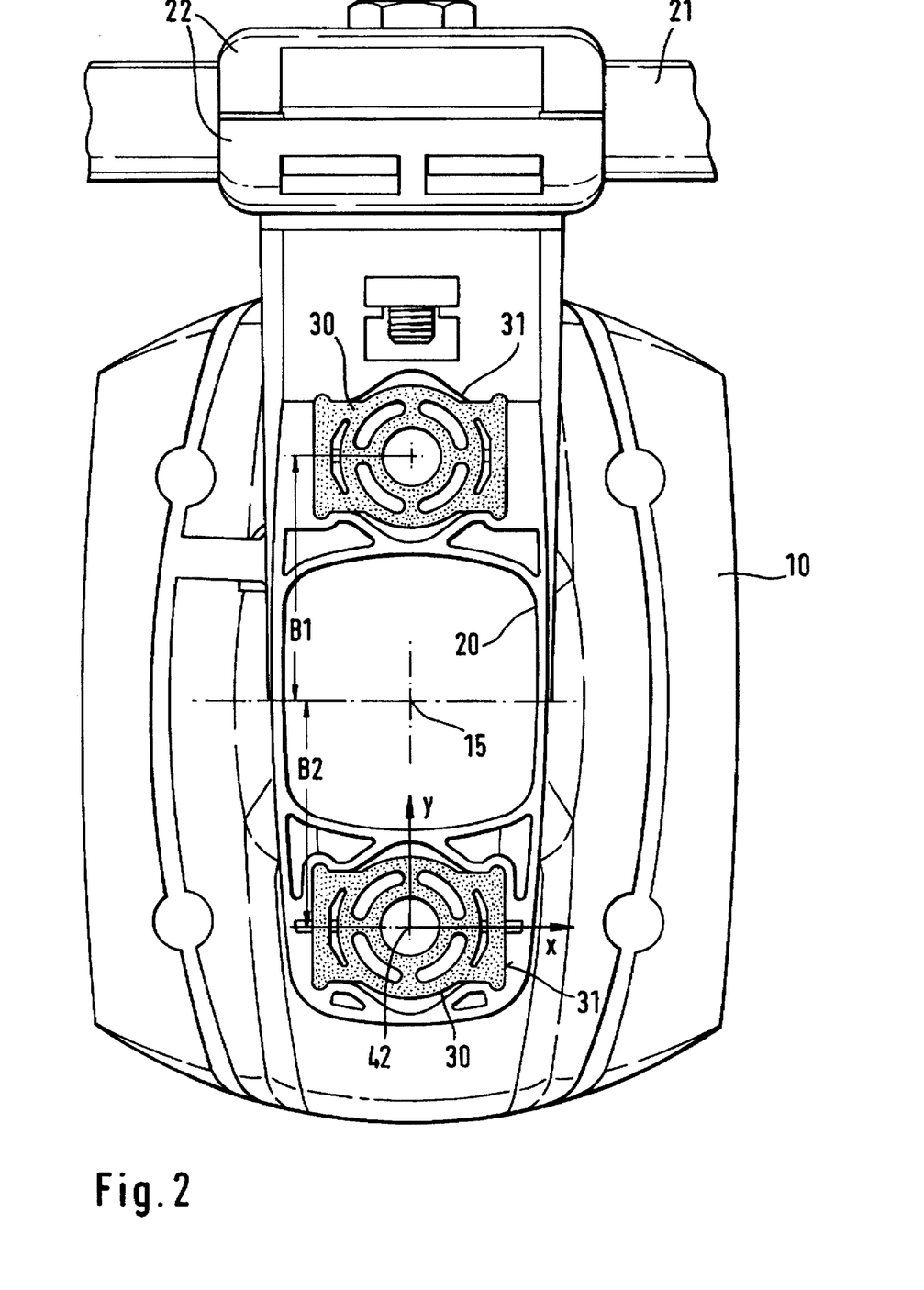
FIG. 2 shows an end view of the end of the grip tube facing away from the motor housing.
Figure 3:
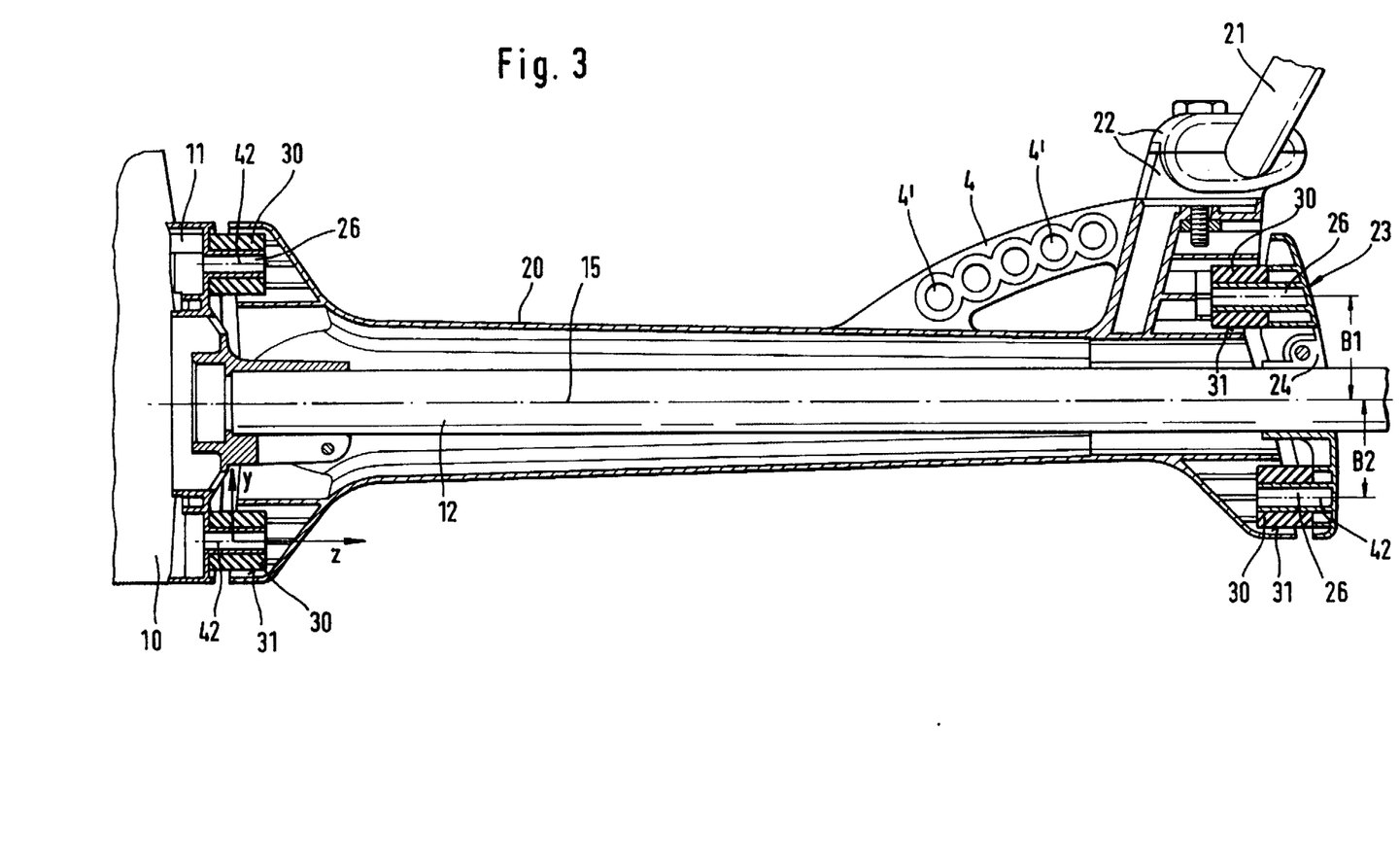
FIG. 3 is a longitudinal section of the grip tube arranged at the working tool.

As can be seen in FIGS. 2 and 3, at the respective end faces of the grip housing 20 vibration damping members 30 are arranged one atop the other in the shown cross-sectional plane. They are preferably of identical design and consist of an elastic material, preferably rubber.

Each vibration damping member 30 is comprised of a core 40 which is substantially of radial symmetry and is provided with outer projections 41 positioned diametrically opposite one another. The projections 41 form a unitary part together with the core 40 and extend in the circumferential direction over an angle of approximately 120°. The projections 41 are substantially parallelepipedal in shape and extend over the entire length L of the vibration damping member 30. Due to these projections 41, each vibration damping member 30 has a greater extension in the direction of the first spatial axis X extending approximately perpendicular to the longitudinal axis 42 of the vibration damping member 30 than in the direction of a second spatial axis Y which is also perpendicular to the longitudinal axis 42 of the vibration damping member 30. Preferably, the first spatial axis X is positioned perpendicular to the second spatial axis Y so that the spatial axes X and Y together with the longitudinal axis 42 of the vibration damping member 30 as the Z-axis form a Cartesian coordinate system. Preferably, the vibration damping member 30 is symmetrically designed relative to the X-axis and/or the Y-axis.

In the embodiment according to FIGS. 2–5 the core 40 of the vibration damping member 30 is comprised of a central inner ring 43 and an outer ring 44 which is coaxially positioned thereto. The inner ring 43 and the outer ring 44 have the same length L and are supported relative to one another. In the shown embodiment, the inner ring 43 is connected with support projections in the form of longitudinal stays 45 to the outer ring 44 whereby the longitudinal stays 45 extend over the entire length L in the manner of a reinforcement rib. It may be advantageous to arrange, instead of or in addition to the longitudinal stays 45, radial stays which are positioned with axial distance relative to one another and which extend preferably over 360°.

Figure 4:
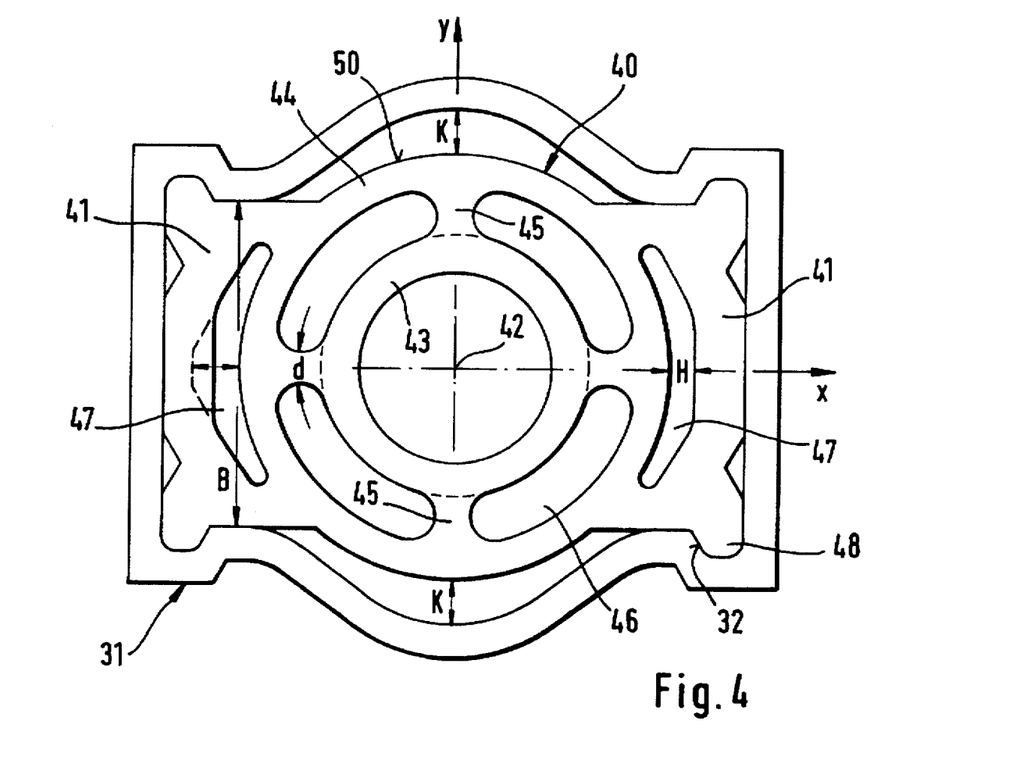
FIG. 4 is an end view of a vibration damping member arranged in a receiving cage.
Figure 5:
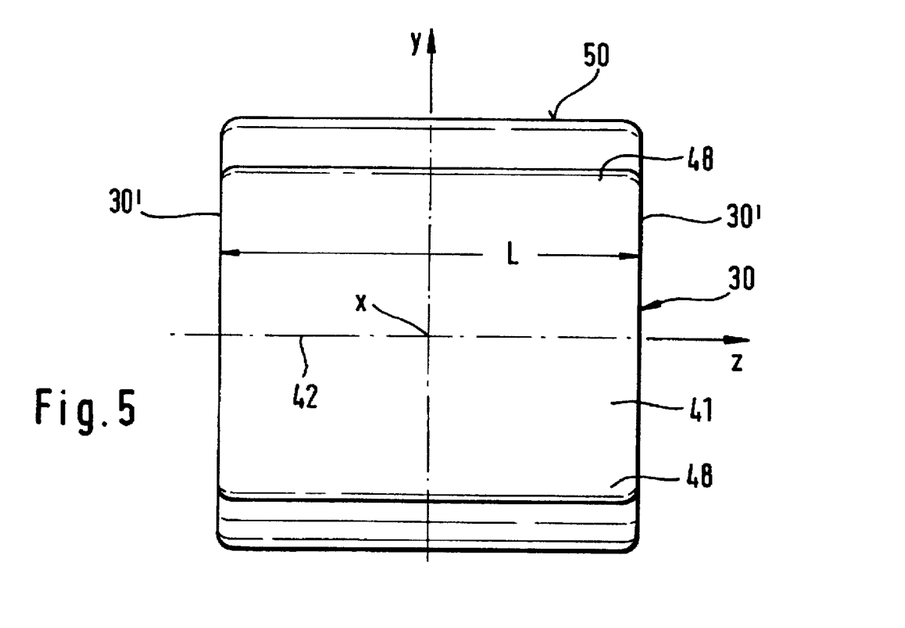
FIG. 5 is a side view of the vibration damping member of FIG. 4.

As indicated in a dashed line in FIG. 4, the longitudinal stays 45 can also be separate from the inner ring 43. The inner ring 43 may be omitted. The pins 26 then rest directly on the stays 45. In a corresponding manner, it is also possible to embody the inner wall of the outer ring 44, which is facing the pins 26, so as to be provided with radial projections such as teeth, knobs, corrugations or ribs.

Between the radial or axial stays, hollow spaces are provided which in the shown embodiment are in the form of longitudinal holes 46'. These longitudinal holes 46' extend from one end face of the vibration damping member 30 to the other and are in the form of circumferential slots 46. About the circumference, four slots 46 of the same length are provided which are spaced equidistantly. The distance d is determined by the thickness of the longitudinal stays 45 whereby two longitudinal stays are positioned diametrically opposite to one another along the X-axis, respectively, the Y-axis.

Furthermore, in the area of the projection 41 a further hollow space 47 is provided which is preferably a pocket 47 extending over the length L of the vibration damping member 30. The hollow space, respectively, the pocket 47 is open at the end faces 30' of the vibration damping member 30. In the embodiment according to FIG. 4 the pocket 47 is positioned between the core 40 and the projection 41, preferably directly at the outer mantle surface 50 of the core 40. The pocket 47 extends substantially over the width B of the projection 41, whereby in the direction of the spatial axis X, it has a height H which increases from the ends of the pocket in the Y direction toward the middle of the pocket. It may be expedient, as indicated in dashed lines in FIG. 4, to have the greatest height H along the spatial axis X.

Figure 1:
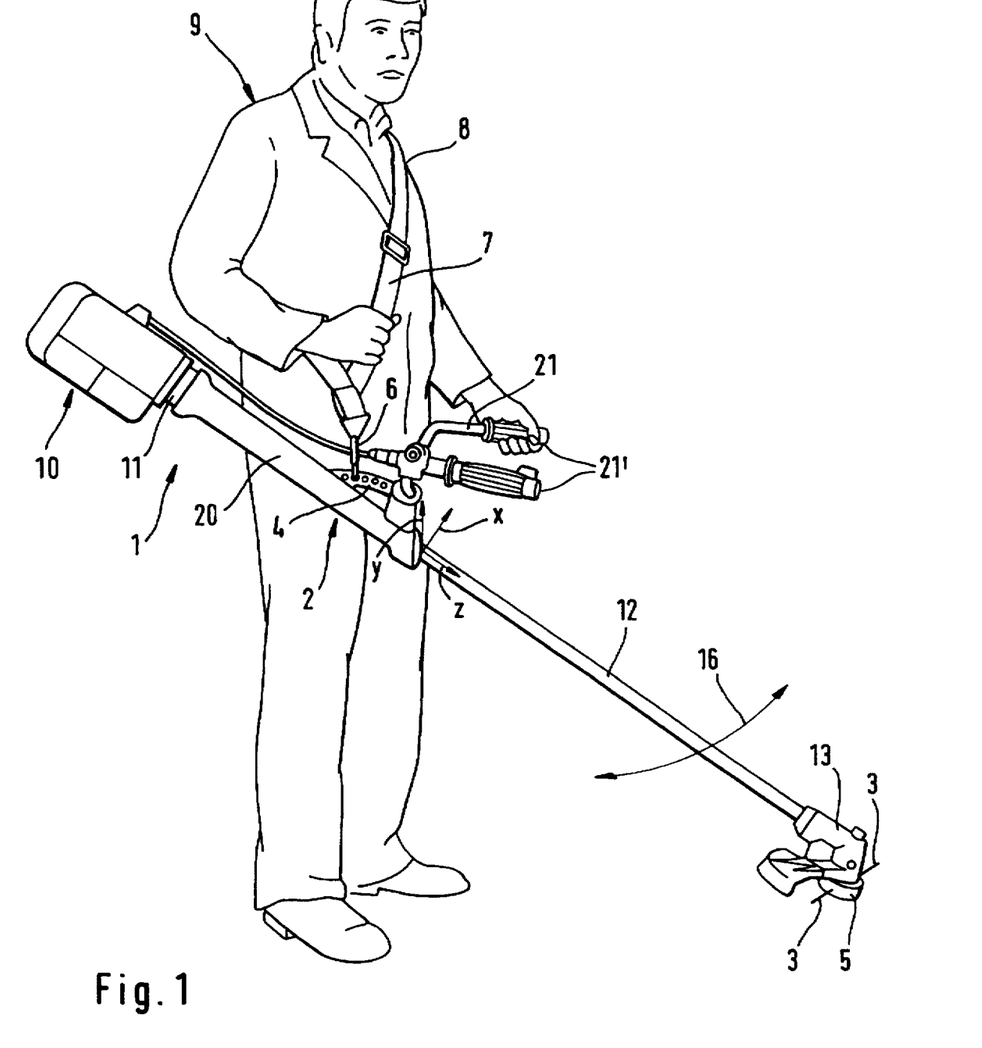
FIG. 1 is a perspective view of an operator carrying the trimmer.

As can be seen in FIGS. 2, 3, and 4, the vibration damping member 30 is positioned in a receiving cage 31 which in the embodiment is connected to the end face of the grip tube 21. The vibration damping member 30 is received in the axial direction over a great portion of its length, preferably over more than half of its length, in the receiving cage 31. The Z-axis of the Cartesian coordinate system, which forms the longitudinal axis 42 of the vibration damping member 30, is positioned substantially parallel to the longitudinal axis 15 of the guide tube 12. As shown in FIG. 2, a spatial axis of the vibration damping member 30, in the shown embodiment the Y-axis, intercepts the longitudinal axis 15 of the guide tube 12. The other spatial axis, in the shown embodiment the X-axis, is positioned at a distance B1, respectively, B2 to the longitudinal axis 15. The distance B1 is greater than the distance B2. The longitudinal axes 42 of the vibration damping members 30 are positioned in a common plane with the longitudinal axis 15 of the guide tube 12. This common plane, in the operating position of the hand-held working tool shown in FIG. 1, is a vertical plane. The X-axes of the vibration damping members 30 are positioned perpendicular to this plane and form together with the longitudinal axis 42 of the vibration damping member a substantially horizontal plane in which the trimmer is moved back and forth in the direction of double arrow 16 (FIG. 1).

In the direction of the X-axis the vibration damping member 30 is substantially positioned without play within the receiving cage 31 positioned at the grip housing 20. Preferably, the beads 48 provided at the projections 41 engage longitudinal grooves 32 of the receiving cage 31 which extend in the direction of the Z-axis. At both longitudinal edges extending in the direction of the Z-axis beads 48 are arranged so that each projection 41 in the direction of the X-axis is fixed in a positive-locking manner within the receiving cage 31.

In the direction of the Y-axis the outer mantle surface 50 of the core is positioned with play within the receiving cage 31. As shown in FIG. 4, the maximum play K is provided in the Y-Z plane. On both sides of this Y-Z plane the play K is reduced to zero in the direction toward the projections.

As shown in FIG. 3, at the level of the receiving cages 31 provided at the end faces of the grip tube 21, pins 26 are formed, on the one hand, at the motor housing 10 and on the other hand, at the housing support 23. These pins 26 extend substantially centrally into the core 40 so as to be held substantially centrally by the stays 45, respectively, by the inner ring 43 supported by the stays 45. Each pin 26 extends into the receiving cage 31 preferably over approximately half its length. In an advantageous embodiment shown in FIG. 3, the length of the pin 26 is identical to the length L of the vibration damping members 30 so that the pin 26 penetrates the vibration damping member 30 to the opposite end face.

After positioning the vibration damping members 30 on the pins 26 of the motor housing 10, the grip housing 20 is mounted thereto so that the receiving cages 31 on the opposite end face of the grip housing 20 engage the corresponding vibration damping members 30 positioned on the pins 26 of the housing support 23. During mounting, the housing support 23 is displaced along the guide tube 12 and positioned thereat such that the vibration damping members 30 are clamped axially between the grip unit, on the one hand, and the drive unit, on the other hand. It may be advantageous to apply a defined axial force onto the vibration damping members 30.

The vibrations resulting from the drive unit during operation are essentially not transmitted to the grip housing 20 and thus to the grip tube 21 due to the presence of the vibration damping members 30. This vibration damping action takes place primarily via the longitudinal stays 45 of the outer ring 44, respectively, the suspended inner ring 43. The design is selected such that a maximum damping effect is achieved.

When the cutter or trimmer is moved by the operator 9 with the grip tube 21, a different damping effect is provided. In the Y-Z plane the resulting forces load the outer ring 44 so as to be deflected due to the play K within the receiving cage 31. This results in a progressive damping action relative to the inner ring 43 so that the operator 9 in the Y-Z plane feels an acceptable guiding behavior for moving the working tool up and down. The damping effect can be selected to be so soft that a sufficient vibration damping action is still ensured. A travel limitation in the direction Y and thus a direct guiding behavior is still possible after bridging the play K and contact of the outer ring 44 at the inner wall of the receiving cage 31.

Upon movement in the direction of arrow 16, the vibration damping member is substantially loaded in the Z-X plane. In this plane, due to the longitudinal stays 45, the outer ring 44 is first activated so that a stiffer guiding behavior is achieved. When the working tool hits upon an obstacle etc., the forces within the grip tube 21 cause the height H of the pocket 47 to be bridged. The pocket 47 is compressed entirely so that the resulting forces are directly guided via the elastic material into the receiving cage 31. This provides in the direction of force action a quasi rigid connection between the pin 26 and the receiving cage 31 so that a direct, relatively hard guiding behavior is ensured. Simultaneously, it is however ensured that vibration-technologically no shorting results because between the pin 26, on the one hand, and the receiving cage 31, on the other hand, there is always elastic material of the vibration-damping member 30 present. A direct contact of the pin 26 with the grip housing 20 is thus impossible. Even with a bridged vibration damping member there is still a minimal damping effect to be achieved.

As shown in FIG. 3, in order to obtain a good damping behavior while maintaining direct guiding behavior, the arrangement of four vibration damping members is expedient whereby the Z-axis of the vibration damping members 30 can be positioned in a common plane. It may be expedient to arrange one or more vibration damping members 30 at the end face in a different position than the remaining vibration damping members. This can be especially advantageous for motor chainsaws, cutters, etc. In the shown embodiment, all Z-axes of the vibration damping members 30 are positioned in a common plane which also comprises the longitudinal center axis 15 of the guide tube 12.

Figure 6:
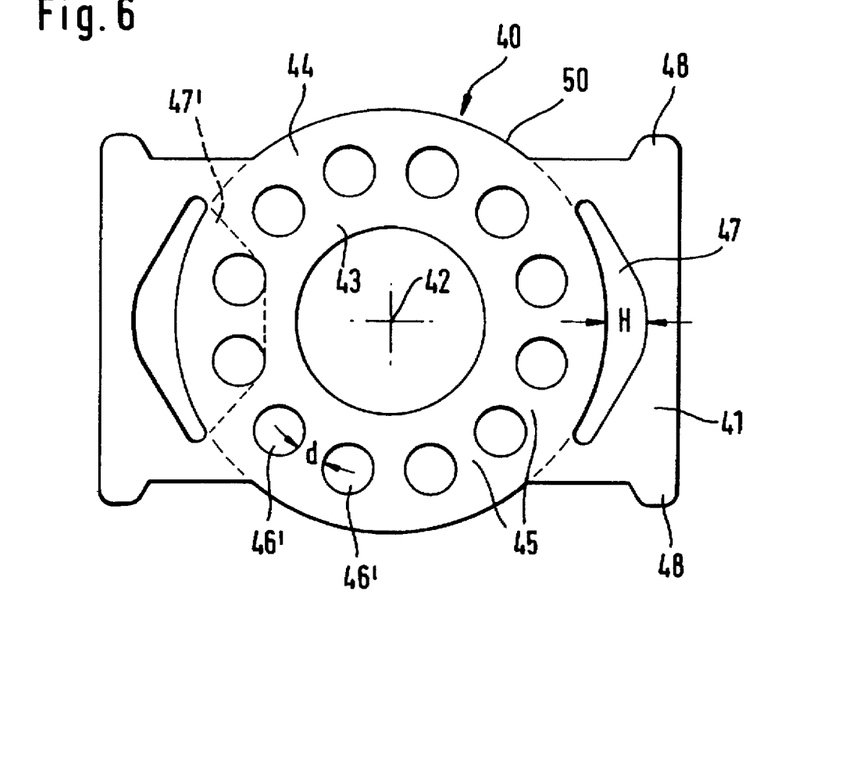
FIG. 6 is an end view of a further embodiment of a vibration damping member.
Figure 7:
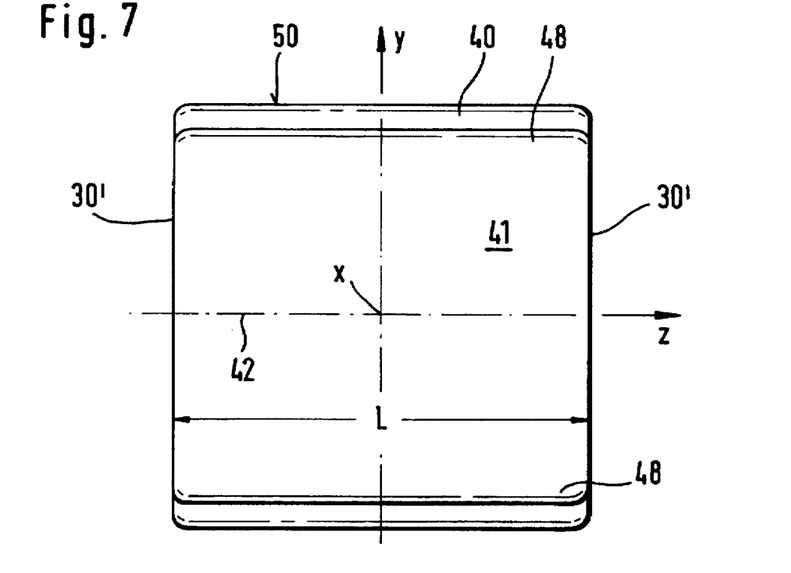
FIG. 7 is a side view of the vibration damping member according to FIG. 6.

In the embodiment according to FIGS. 6 and 7, the core 40 of the vibration damping member 30 is comprised of an inner ring 43 and an outer ring 44 which are separated by a plurality of longitudinal holes 46' which extend from one end face 30' to the other. The longitudinal holes 46' have preferably the same diameter and are spaced equidistantly in the circumferential direction by a distance d. This results in longitudinal stays 45 extending in the longitudinal direction over the entire length L of the vibration damping member 30 and connecting the inner ring 43 to the outer ring 44. In the embodiment according to FIG. 6 twelve longitudinal holes are arranged over the circumference which have a diameter which is approximately twice the distance d.

The pockets 47 positioned adjacent to the outer mantle surface 50 of the outer ring 44 within the projections 41 extend in the circumferential direction approximately over the width of the projections 41. The height H in the Z-X plane is approximately twice the height at the ends of the pocket 47 in the circumferential direction. It may be expedient to embody a pocket 47' (FIG. 6, dashed line) which includes an individual or a plurality of longitudinal holes 46' and thus extends into the core 40.

As shown in the embodiment of FIG. 4, the longitudinal edges of the projections 41 are provided with beads 48 extending in the direction of the Z-axis which are positioned on oppositely arranged sides. The beads 48 engage corresponding longitudinal grooves 32 (FIG. 4) of the receiving cage 31 and ensure that the projections 41 cannot slip out of the receiving cage 31 within the Z-X plane which could especially occur upon bridging of the height H of the pocket 47.

Figure 8:
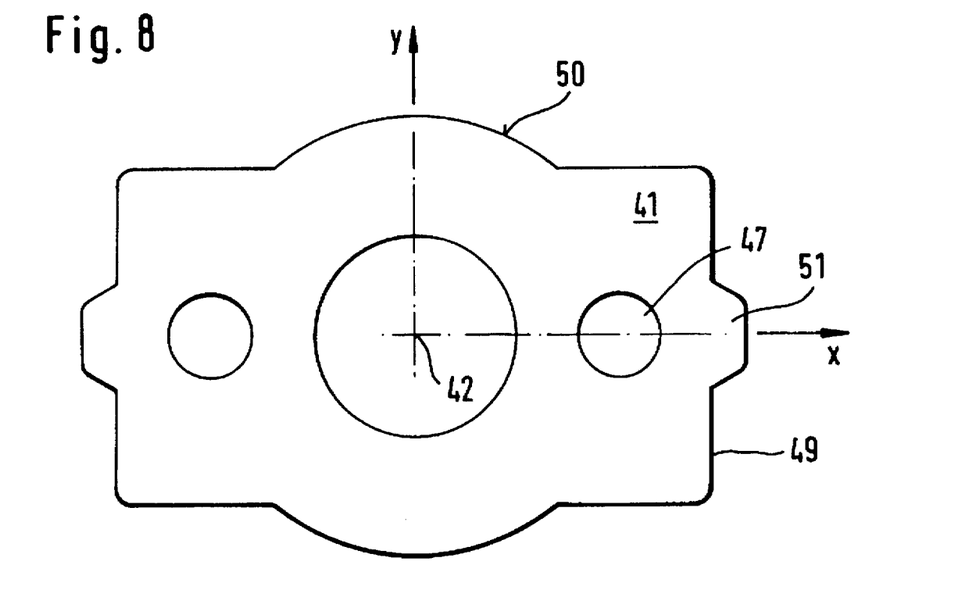
FIG. 8 is an end view of a third vibration damping member.
Figure 9:
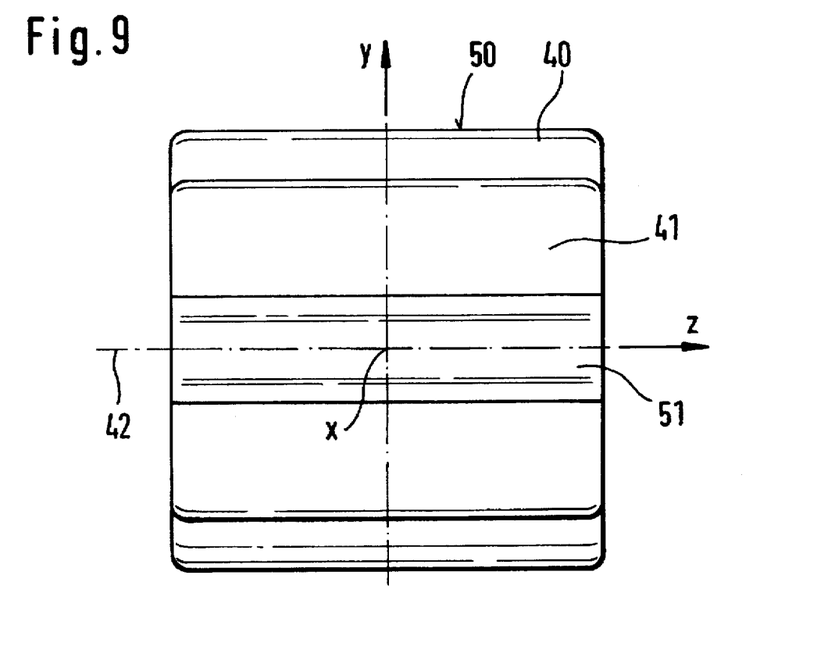
FIG. 9 is a side view of the vibration damping member according to FIG. 8.

In the embodiments according to FIGS. 4 and 6, the vibration damping members 30 have a three step behavior in the Z-X plane. The vibration damping member 30 according to the embodiment of FIG. 8 has a two-step behavior in the Z-X plane. The vibration damping member 30 of FIG. 8 is substantially comprised of a hollow cylinder as a core 40 whereby the hollow cylinder has a wall thickness which is slightly greater than the radius of the inner hollow space. The projections 41, which are arranged in the same manner as shown in FIGS. 4 and 6 so as to be diametrically opposite to one another, have the same width which is smaller than the outer diameter of the core 40. Each projection 41 is provided with a bore as a hollow space 47 whereby the bore 47 in the area of the projection intercepts the outer mantle surface 50 of the hollow cylinder forming the core. The axis of the bore is positioned in the Z-X plane. The hollow space 47 may also have other cross-sectional shapes, for example, a rectangular cross° section.

In the embodiment according to FIG. 8, a longitudinal rib 51 is provided on the longitudinal side 49 of a projection 41 which ensures a play-free contact within the receiving cage 31 in the Z-X plane.

The present invention is, of course, in no way restricted to the specific disclosure of the specification and drawings, but also encompasses any modifications within the scope of the appended claims.

What we claim is:

1. A hand-held working tool comprising:
 a tool member;
 a drive unit with an internal combustion engine drivingly connected to said tool member;
 a grip unit comprising vibration damping members, said grip unit connected with said vibration damping members to said drive unit;
 receiving cages for receiving said vibration damping members, wherein said receiving cages are connected to one of said drive unit and said grip unit;
 pins connected to the other one of said drive unit and said grip unit, said pins having a longitudinal axis and extending in the direction of said longitudinal axis at least partly into said receiving cages so as to be positioned substantially centrally in said vibration damping members;
 wherein said vibration damping members have a greater extension in a direction of a first axis extending substantially perpendicular to said longitudinal axis than in a direction of a second axis extending substantially perpendicular to said longitudinal axis.

2. A hand-held working tool according to claim 1, wherein said second axis is substantially perpendicular to said first axis.

3. A hand-held working tool according to claim 1, wherein said longitudinal axis is a Z-axis, said first axis is a X-axis, and said second axis is a Y-axis of a three-dimensional Cartesian coordinate system.

4. A hand-held working tool according to claim 1, wherein said vibration damping members are symmetrical relative to said first and second axes.

5. A hand-held working tool according to claim 1, wherein said vibration damping members are comprised of a core with radial symmetry and of outer projections integrally connected to said core so as to be diametrically oppositely arranged at said core.

6. A hand-held working tool according to claim 5, wherein said outer projections have a parallelepipedal contour.

7. A hand-held working tool according to claim 5, wherein said core is comprised of an outer ring with radially inwardly extending support projections.

8. A hand-held working tool according to claim 7, wherein said core further comprises an inner ring supported by said support projections.

9. A hand-held working tool according to claim 8, wherein said support projections are longitudinal stays connecting said inner ring and said outer ring.

10. A hand-held working tool according to claim 8, wherein between said inner ring and said outer ring longitudinal holes are positioned which extend through said vibration damping members in the direction of said longitudinal axis.

11. A hand-held working tool according to claim 10, wherein said longitudinal holes have an identical diameter.

12. A hand-held working tool according to claim 10, wherein said longitudinal holes are equidistantly spaced in a circumferential direction of said inner ring.

13. A hand-held working tool according to claim 10, wherein said longitudinal holes are arranged so as to describe a circle.

14. A hand-held working tool according to claim 8, wherein between said inner ring and said outer ring longitudinal curved slots are positioned which extend through said vibration damping members in the direction of said longitudinal axis.

15. A hand-held working tool according to claim 14, wherein said longitudinal curved slots have an identical length in a circumferential direction of said inner ring.

16. A hand-held working tool according to claim 14, wherein said longitudinal curved slots are equidistantly spaced in a circumferential direction of said inner ring.

17. A hand-held working tool according to claim 14, wherein said longitudinal curved slots are arranged so as to describe a circle.

18. A hand-held working tool according to claim 5, wherein said vibration damping members comprise a hollow space in the area of said projections, said hollow space extending in the direction of said longitudinal axis.

19. A hand-held working tool according to claim 18, wherein said vibration damping members have end faces in the direction of said longitudinal axis and wherein said hollow space is open at said end faces.

20. A hand-held working tool according to claim 18, wherein said hollow space is positioned between said core and one of said diametrically oppositely arranged projections.

21. A hand-held working tool according to claim 20, wherein said hollow space is positioned directly adjacent to a projected outer mantle surface of said core.

22. A hand-held working tool according to claim 20, wherein said hollow space in a circumferential direction of said core extends over the entire width of said one diametrically oppositely arranged projection.

23. A hand-held working tool according to claim 20, wherein said hollow space in a circumferential direction of said core has a varying height.

24. A hand-held working tool according to claim 1, wherein said vibration damping members in the direction of said first axis rest without play within said receiving cages.

25. A hand-held working tool according to claim 1, wherein said vibration damping members in the direction of said second axis rest with play within said receiving cages.

* * * * *